(12) United States Patent
Riggs

(10) Patent No.: US 9,435,463 B2
(45) Date of Patent: Sep. 6, 2016

(54) SEALED GIMBAL FOR OCEAN THERMAL ENERGY CONVERSION COLD WATER PIPE

(71) Applicant: Seahorse Equipment Corp, Houston, TX (US)

(72) Inventor: David C. Riggs, Coppell, TX (US)

(73) Assignee: Seahorse Equipment Corp., Houston, TX (US)

( * ) Notice: Subject to any disclaimer, the term of this patent is extended or adjusted under 35 U.S.C. 154(b) by 243 days.

(21) Appl. No.: 14/014,765

(22) Filed: Aug. 30, 2013

(65) Prior Publication Data

US 2014/0059825 A1    Mar. 6, 2014

Related U.S. Application Data

(60) Provisional application No. 61/695,880, filed on Aug. 31, 2012.

(51) Int. Cl.
| | | |
|---|---|---|
| *E21B 17/01* | (2006.01) | |
| *E21B 19/00* | (2006.01) | |
| *F03G 7/05* | (2006.01) | |
| *F16L 3/00* | (2006.01) | |
| *F16L 27/04* | (2006.01) | |

(52) U.S. Cl.
CPC ................. *F16L 3/00* (2013.01); *E21B 17/01* (2013.01); *E21B 19/004* (2013.01); *F03G 7/05* (2013.01); *F16L 27/04* (2013.01); *Y02E 10/34* (2013.01); *Y10T 29/49815* (2015.01); *Y10T 29/49826* (2015.01)

(58) Field of Classification Search
CPC .... E21B 17/01; E21B 17/017; E21B 19/004; E21B 19/006; F16L 3/00; F16L 27/04; F03G 7/05
USPC .................................................. 166/359, 367
See application file for complete search history.

(56) References Cited

U.S. PATENT DOCUMENTS

| | | | | |
|---|---|---|---|---|
| 3,416,819 A | * | 12/1968 | Day ........................ | F16L 27/12 285/148.19 |
| 3,581,506 A | * | 6/1971 | Howard .................... | F16L 1/19 173/196 |
| 3,698,192 A | * | 10/1972 | Le Febvre, Jr. .......... | F02K 9/84 239/265.35 |
| 3,856,335 A | * | 12/1974 | Blake ....................... | E21B 17/07 285/288.1 |
| 3,913,951 A | * | 10/1975 | LeFebvre, Jr. ............ | F16D 3/80 285/223 |
| 4,024,770 A | * | 5/1977 | Liesenborghs .......... | F16C 29/00 74/18.2 |
| 4,350,014 A | * | 9/1982 | Sanchez .................. | B63B 35/44 114/264 |
| 4,363,570 A | * | 12/1982 | van der Pot .............. | F03G 7/05 114/264 |
| 4,943,188 A | * | 7/1990 | Peppel ................... | B63B 21/502 114/294 |
| 5,102,150 A | * | 4/1992 | Kahn ....................... | F16J 15/46 277/646 |
| 5,116,085 A | * | 5/1992 | Carrel ..................... | F16L 51/02 277/634 |
| 5,395,183 A | * | 3/1995 | Watkins ................ | E21B 19/004 166/350 |
| 5,667,224 A | * | 9/1997 | Streckert .................. | F16J 15/52 220/62.11 |
| 7,373,986 B2 | * | 5/2008 | Pollack ............... | E21B 43/0107 166/345 |
| 7,402,001 B2 | * | 7/2008 | Stassen ................. | E21B 17/012 166/367 |
| 7,735,321 B2 | * | 6/2010 | Howard .................. | B63B 35/44 114/264 |
| 8,016,324 B2 | * | 9/2011 | Gutierrez-Lemini . | F16L 27/103 285/146.3 |

\* cited by examiner

*Primary Examiner* — Matthew R Buck
(74) *Attorney, Agent, or Firm* — Blank Rome, LLP

(57) ABSTRACT

A gimbal that provides for passive vertical latching and unlatching of a Cold Water Pipe (CWP) in a floating vessel such as an Ocean Thermal Energy Conversion (OTEC) facility is sealingly connected to a cold water sump on the floating vessel. The CWP gimbal is capable of reacting all static and dynamic forces of the suspended CWP at angles on the order of +/−20 degrees while remaining sealed at high differential pressures.

1 Claim, 3 Drawing Sheets

SEALED GIMBAL FOR OCEAN THERMAL ENERGY CONVERSION COLD WATER PIPE

CROSS-REFERENCE TO RELATED APPLICATIONS

This application claims the benefit of U.S. Provisional Application No. 61/695,880, filed on Aug. 31, 2012.

STATEMENT REGARDING FEDERALLY SPONSORED RESEARCH OR DEVELOPMENT

Not Applicable

BACKGROUND OF THE INVENTION

1. Field of the Invention

This invention relates to floating vessels requiring the input of large volumes of cold seawater to support onboard processes—e.g., Ocean Thermal Energy Conversion (OTEC) facilities, floating natural gas liquefaction plantships, and the like. More particularly, it relates to the Cold Water Pipe (CWP) used to bring cold water up from depth in such facilities.

2. Description of the Related Art Including Information Disclosed Under 37 CFR 1.97 and 1.98

The OTEC (Ocean Thermal Energy Conversion) process uses the temperature difference between warm surface seawater and cold, deep seawater (~1000 m below the surface) to power a heat engine and produce useful work, usually in the form of electricity. The most commonly used heat cycle for OTEC is the Rankine cycle using a low-pressure turbine. Systems may be either closed-cycle or open-cycle. Closed-cycle engines use working fluids that are typically thought of as refrigerants such as ammonia, R-134a or organic fluids. Open-cycle engines use vapor from the seawater itself as the working fluid. OTEC facilities may generate electricity and desalinated water as well as other energy carriers such as hydrogen ($H_2$) and ammonia ($NH_3$).

The OTEC process requires one or more large diameter Cold Water Pipes (CWPs) connected to a floating power plant that extend to ocean depths of approximately 500 to 1000 meters. The CWP is a conduit for the delivery of cold water to the surface, and the CWPs are sized on the order of 4 meters in diameter for each 10 MW of power generation capacity.

The large diameter CWP may be rigidly constructed of steel, thermoplastics, fiberglass reinforced plastic (FRP) or other suitable materials. The CWP is subjected to the first and second order motions of the surface floater, ocean currents and submerged wave forces, as well as hydraulic pressure differentials.

The CWP must gimbal freely while connected to the surface vessel at quasi-static and dynamic angles of approximately 10 to 20 degrees with respect to the vertical axis. During these conditions the CWP must continually deliver cold water to the surface power plant with minimal flow restrictions in the pipe inner diameter. The gimbal must therefore provide an effective seal and support the CWP self-weight, inertial, and drag forces while gimballing with respect to the surface vessel. The gimbal seal must withstand differential pressures of approximately 1.7 bar, which are normally positive on the outside of the CWP, but can also be positive on the inside of the CWP under some conditions.

Gimballing connections have been provided for Steel Catenary Risers (SCRs) to surface floaters which are capable of sealingly transporting fluids under pressure such as oil, gas and water. These pipeline connections are usually on the order of 8 to 24 inches in diameter. However, the gimballing connection of the OTEC CWP poses unique problems due to its order-of-magnitude larger diameter. This can be solved by keeping the gimballing structural connection near the center of the CWP, but the seal must withstand a relatively high pressure at the CWP outer diameter, while accommodating large radial excursions on the order of +/−1 to 2 meters.

U.S. Pat. No. 7,373,986 discloses a riser connector that connects the upper portion of a riser having a latching enlargement to a receptacle on a vessel, so the riser upper end can connect to a fluid coupling leading to a conduit on the vessel. The enlargement has a diameter larger than that of the riser and encircles the riser. A double-click mechanism, with parts on the enlargement and on the receptacle, turns a load ring on the enlargement to latch the enlargement in place when it is lifted to an upper position and lowered to a latched position, and releases it by again lifting and lowering. A cable coupling is temporarily mounted on the top of the riser to enable the riser to be lifted by a cable, the cable coupling being later removed to connect the riser upper end to the fluid coupling on the vessel.

BRIEF SUMMARY OF THE INVENTION

The invention is a sealed gimbal that provides for passive vertical latching and unlatching of the CWP, which is in turn sealingly connected to the floating vessel—e.g., an OTEC surface power plant. The CWP gimbal is capable of reacting all static and dynamic forces of the suspended CWP at angles on the order of +/−20 degrees while remaining sealed at high differential pressures.

Other OTEC conceptual designs propose a large bellows or diaphragm (presumably made from rubber) to seal the differential pressure. A gimballing ball connection is usually described for the structural connection. As the OTEC concept has thus far only been demonstrated in small, prototype operations, large diameter gimbal seals with high differential pressures are unknown at present.

BRIEF DESCRIPTION OF THE SEVERAL VIEWS OF THE DRAWING(S)

DETAILED DESCRIPTION OF THE INVENTION

Figure 1:
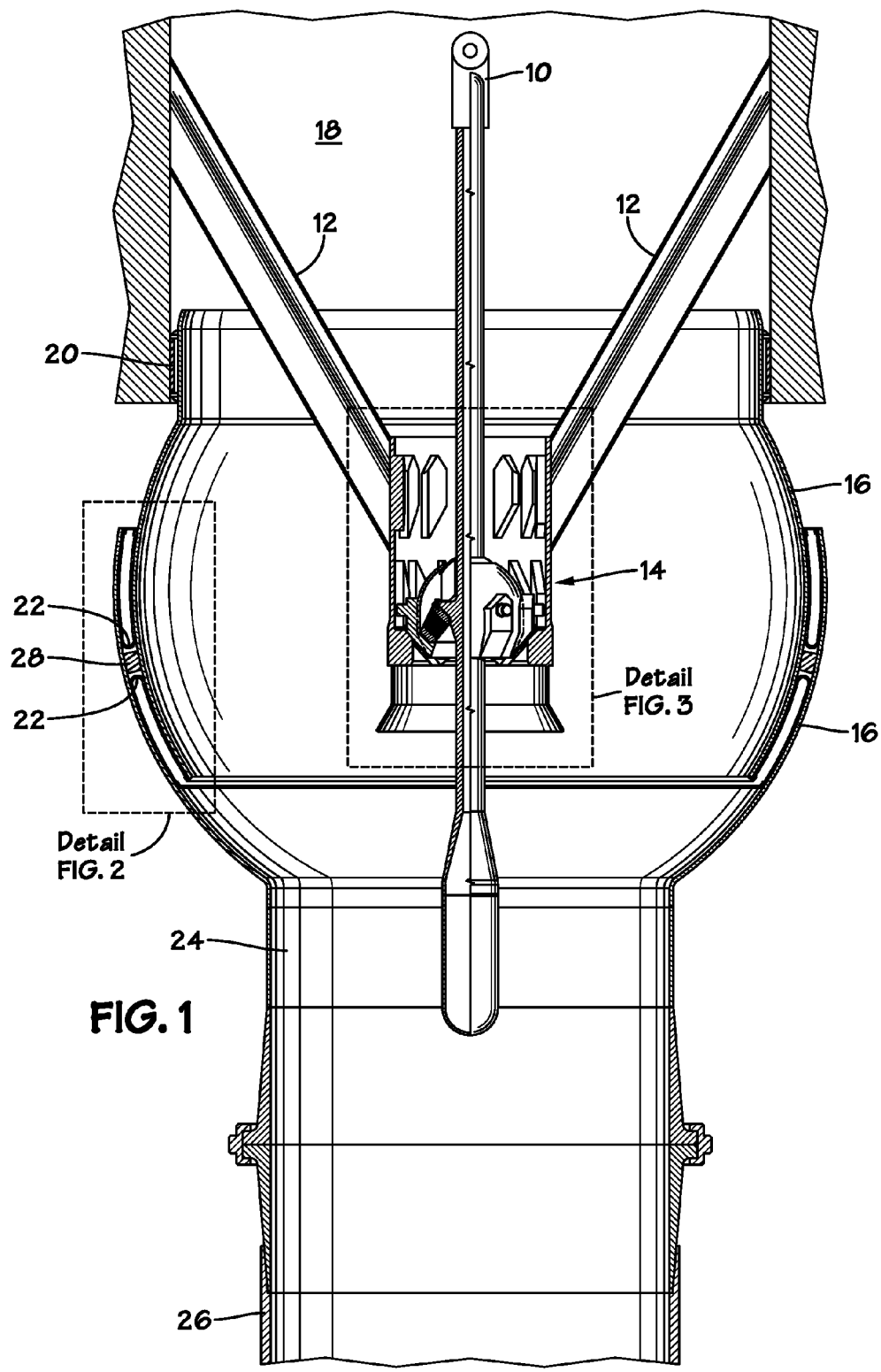
FIG. 1 is a cross-sectional view of a seal gimbal CWP support according to one embodiment of the invention.
Figure 2:
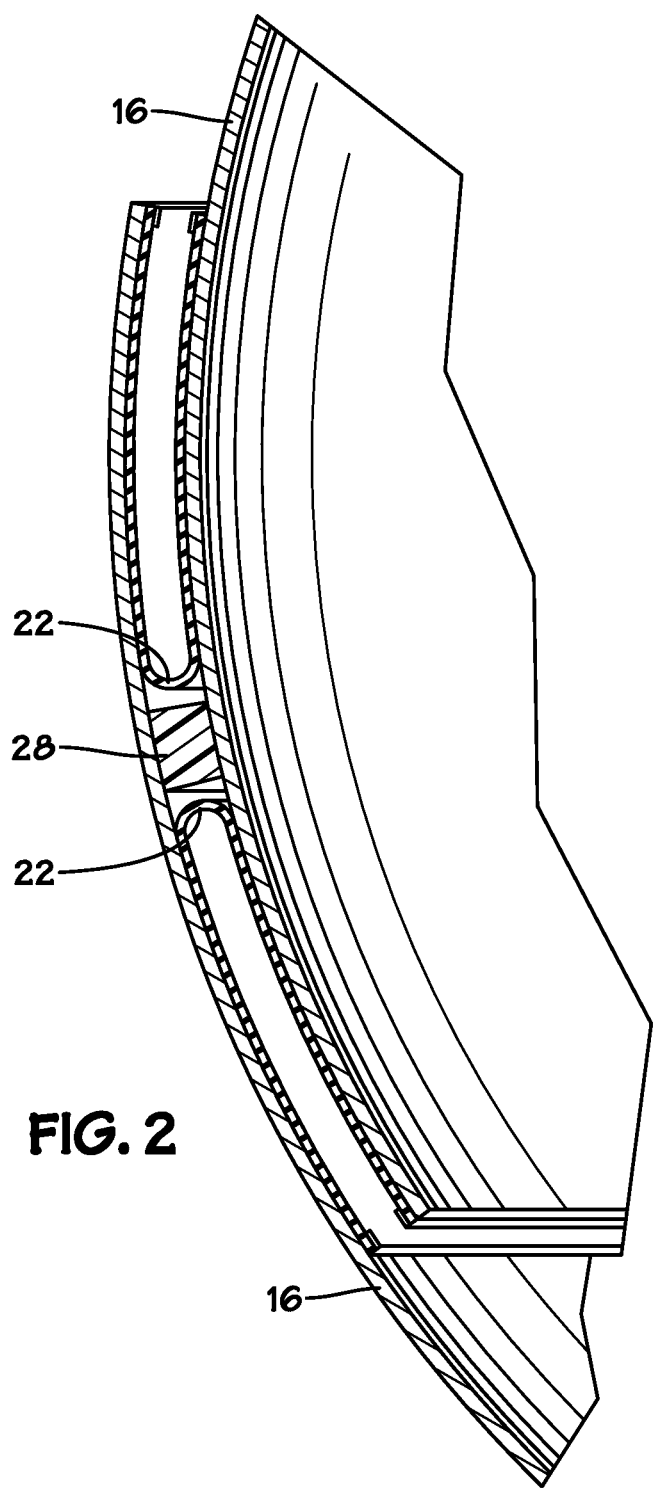
FIG. 2 is an enlarged view of the portion of FIG. 1 indicated as Detail FIG. 2 therein.
Figure 3:
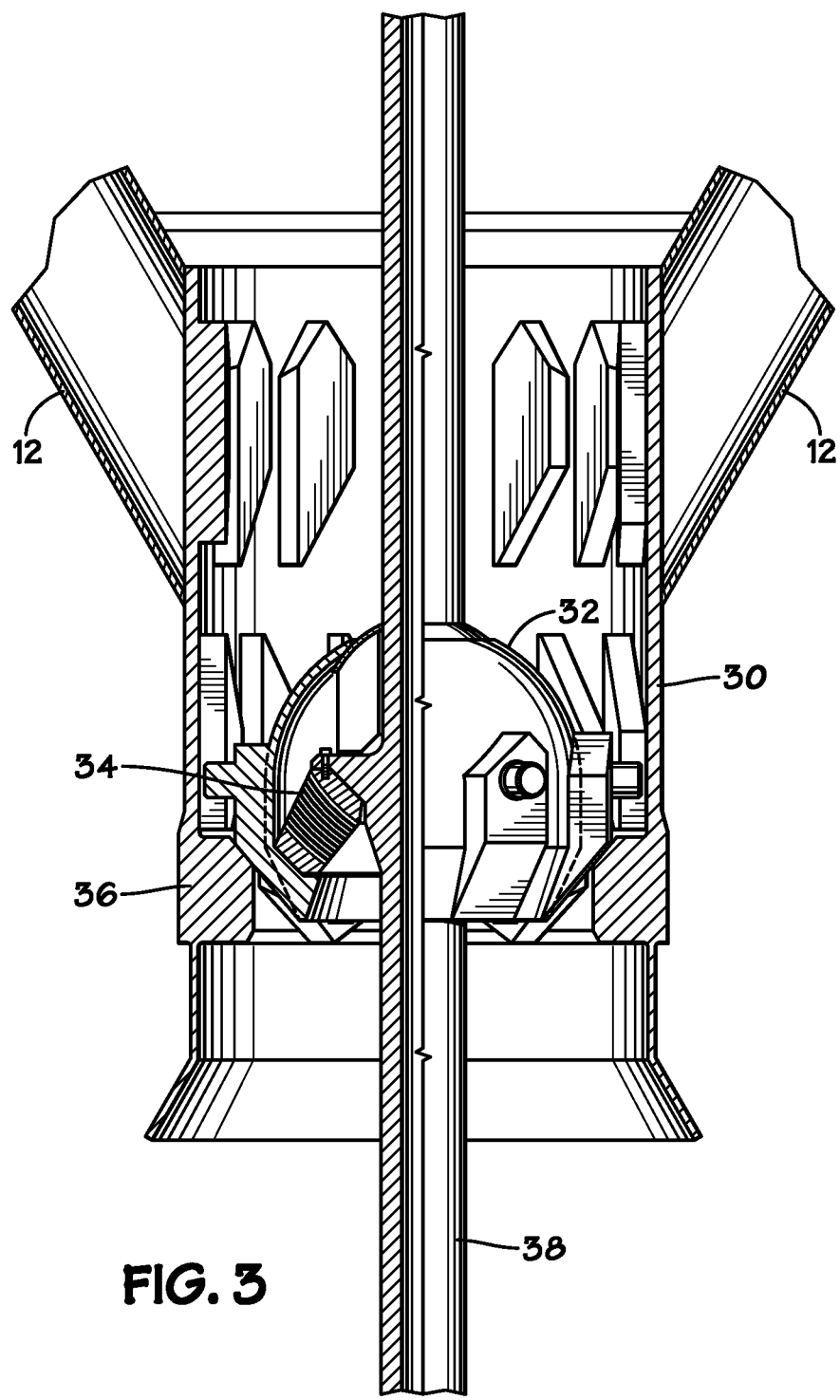
FIG. 3 is an enlarged view of the portion of FIG. 1 indicated as Detail FIG. 3 therein.

The invention may best be understood by reference to the exemplary embodiment(s) illustrated in the drawing figures wherein the following reference numbers are used:

10 pulling head
12 structural pipe connections to moonpool
14 Rotolatch and flexible joint connection
16 spherical shells
18 moonpool well
20 packer seal
22 rolling diaphragm seals
24 structural web plate connections
26 Cold Water Pipe (CWP)
28 anti-compression block 30 receptacle and latching ramps
32 male rotating connector
34 laminated elastomeric bearing
36 receptacle load ring
38 structural pipe connection to CWP.

The structural connection consists of a centrally-located passive rotating latch and spherical elastomeric flexible joint 14 which may be capable of angles of +/−20 degrees under axial loading of approximately 500 tonnes. The outer gimbal seal consists of overlapping spherical shells 16 sealed by rolling diaphragms 22 with opposing concave surfaces to the positive pressure differentials. The spherical shells 16 are overlapped and nested as to rotate about the flexible joint while maintaining a constant sealing gap of minimal pressure area. The rolling diaphragm seals 22 provide effective sealing at large sealing interface excursions without friction due to rubbing or sliding.

The rolling diaphragm seal "bending front" does not stay in one place with respect to the outer shell. The sealing front shifts by the percent difference of the two radii times the sealing arc distance. The anti-compression block 28 needs to accommodate this displacement. In one particular preferred embodiment the displacement may be accommodated with a gap of about 1.6" on each side of the block. Alternatively, the block 28 may be located outside the two sealing fronts.

The top spherical shell 16 of the gimbal seal terminates into the moon pool 18 of the surface power plant. Alternatively, the gimbal (together with the gimbal seal) may terminate at an outboard location such as in a wing tank or at a location outboard of the molded lines of the hull—i.e., "over the side". In such a case, a large-diameter pipe may be hung from a porch containing the female portion of the connector. An inflatable or diaphragm packer 20 provides a seal into the bottom of the sea chest or cold water well of the vessel.

The advantages of a large diameter Cold Water Pipe Sealed Gimbal according to the present invention include at least the following:

a. The vertical latching system is passive which only requires a winch wire to pull in.

b. Latching and unlatching is accomplished by simply raising and lowering the winch wire connected to the CWP.

c. The structural connection accommodates high axial and radial loading while reacting angular excursions on the order of +/−20 degrees.

d. The moments induced by the angular excursions are very low relative to the pipe strength and moment of inertia—on the order of 50 kN-m/deg.

e. The gimbal design is installable by pull in by a winch wire from the floating power plant without the aid of surface divers.

f. The gimbal accommodates all loading and angles with minimal restriction to cold water flow.

g. The spherical shells of the gimbal sealingly connect the CWP to the power plant and can withstand relatively high outer and inner differential pressures of approximately 1.7 bar.

h. The gimbal diaphragm seals do not slide with friction and provide effective sealing with low rotational stiffness, thereby not appreciably adding to bending stresses in the CWP.

i. The Sealed Gimbal of the present invention is relatively inexpensive and simple. It may be constructed of readily available components such as steel tank heads, reinforced rubber conveyor belt material, standard flanges, inflatable packers, spherical flexible joints and rotating latch mechanisms.

j. The gimbal diaphragm seals react to the positive pressure differential at their concave surface, thereby avoiding problems with seal displacement.

k. The gimbal diaphragm seals roll in lieu of sliding and therefore may be expected to last 20 years or more in service.

l. The diaphragm seals between the spherical shells accommodate large relative excursions on the order of +/−1 m with minimal exposed pressure area and resultant sealing loads.

m. The differential in the concave seal shape can provide self-energized sealing by managing the pressure area opposite the seal contact area.

n. All the CWP sealing gimbal components are proven in marine environments with well-established means of corrosion protection.

o. The mechanically-engaged, flexible connector shown in the drawing figures is one of several quick-connect and release mechanisms that may be utilized. The illustrated mechanism is of the type disclosed in U.S. Pat. No. 7,373,986 as part of a riser connector. All of the mechanisms are smaller and internal to the riser.

p. The supporting structural struts may be used for alternative functions such as flow straighteners, instrumentation rack, chemical injection stations, ultraviolet lighting foundations, and the like.

Although particular embodiments of the present invention have been shown and described, they are not intended to limit what this patent covers. One skilled in the art will understand that various changes and modifications may be made without departing from the scope of the present invention as literally and equivalently covered by the following claims.

What is claimed is:

1. A support for a suspended Cold Water Pipe on a floating vessel comprising:
    a gimbal connected to the floating vessel and having means for connecting to the Cold Water Pipe suspended below the vessel;
    a seal comprising overlapping frusto-spherical shells at least partially surrounding the gimbal; and,
    a seal between the overlapping frusto-spherical shells that comprises two internal rolling diaphragms and an anti-compression block between the two rolling diaphragms.

* * * * *